(12) United States Patent
Li et al.

(10) Patent No.: US 8,385,000 B2
(45) Date of Patent: Feb. 26, 2013

(54) CONCENTRIC RING DIELECTRIC LENS

(75) Inventors: Jingjing Li, Palo Alto, CA (US); David A. Fattal, Mountain View, CA (US); Marco Fiorentino, Mountain View, CA (US); Raymond G. Beausoleil, Redmond, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 17 days.

(21) Appl. No.: 13/087,776

(22) Filed: Apr. 15, 2011

(65) Prior Publication Data

US 2012/0262795 A1 Oct. 18, 2012

(51) Int. Cl.
*G02B 3/00* (2006.01)

(52) U.S. Cl. ..................................................... 359/642
(58) Field of Classification Search .................. 359/654, 359/524
See application file for complete search history.

(56) References Cited

U.S. PATENT DOCUMENTS

| | | |
|---|---|---|
| 5,633,527 A | 5/1997 | Lear |
| 5,853,960 A | 12/1998 | Tran et al. |
| 6,627,469 B2 | 9/2003 | O'Brien et al. |
| 2007/0048628 A1 | 3/2007 | Mackey |
| 2008/0316608 A1 | 12/2008 | Sasaki |
| 2009/0142016 A1 | 6/2009 | Aksyuk et al. |
| 2009/0190231 A1* | 7/2009 | Lenchenkov ................. 359/654 |

* cited by examiner

*Primary Examiner* — James Jones

(57) ABSTRACT

A lens and a method of forming a lens are included. A lens can include a plurality of concentric rings formed from a dielectric material interleaved by a plurality of gaps separating the plurality of concentric rings.

15 Claims, 4 Drawing Sheets

CONCENTRIC RING DIELECTRIC LENS

BACKGROUND

Lenses are implemented in a variety of applications to focus light to a focal point at a given focal length from the lens. As an example, lenses can be used for imaging, reading and writing data, and for a variety of surgical applications. The size of the beam spot at the focal point of a lens can depend on a number of factors, but is typically limited by a diffraction limit of the optical signal that is focused by the lens. As such, an optical system that implements such lenses can experience limited resolution associated with images generated using the optical signal.

DETAILED DESCRIPTION

Figure 1:
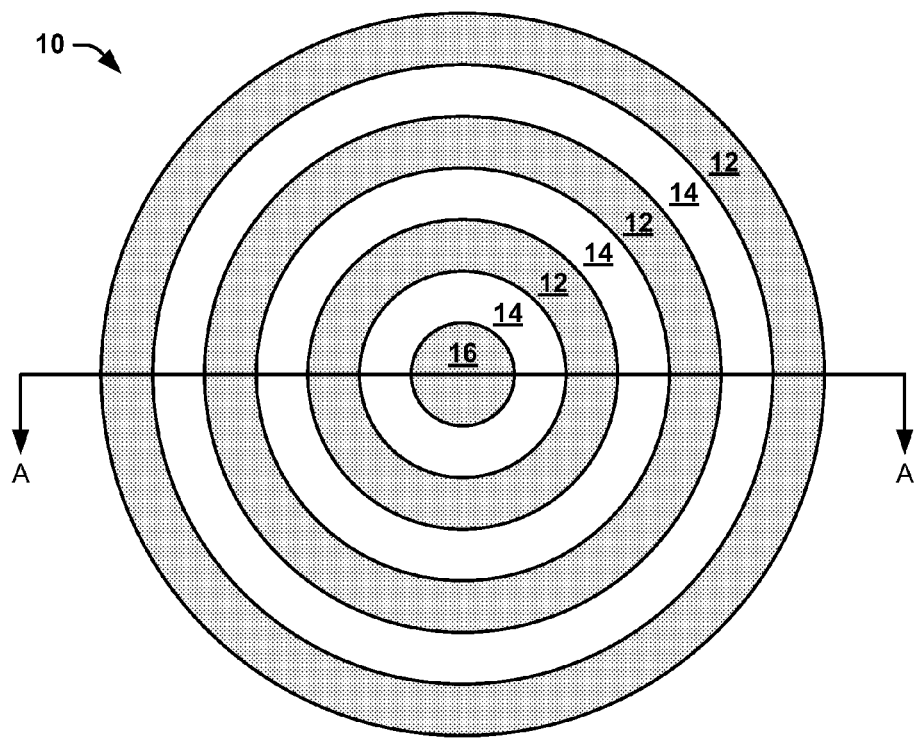
FIG. 1 illustrates an example of a lens.

FIG. 1 illustrates an example of a lens 10. In the example of FIG. 1, the lens 10 is demonstrated on the drawing page from a top-down view. From this perspective the lens 10 is arranged to focus an optical signal that is directed orthogonal to the plane of the page. The lens 10 includes a plurality of rings 12 that are arranged concentric with one another with respective gaps 14 between each of the rings 12. The lens 10 also includes a disc 16 that is located at an approximate center of the lens 10. As an example, the rings 12 and the disc 16 can be formed from a dielectric material, such as silica ($SiO_2$). In addition, the rings 12 and the disc 16 can have a thickness that is approximately equal with respect to each other. As a result, the lens 10 can be planar in shape, thus allowing the lens 10 to be fabricated according to any of a variety of integrated circuit (IC) fabrication processes. As an example, the lens 10 can be formed on a transparent substrate.

The arrangement of the concentric rings 12 of the lens 10 is configured to allow an incident optical signal to be resonantly coupled at each of the concentric rings 12. The resonant coupling of the incident optical signal at each of the concentric rings 12 can substantial cancel (e.g., mitigate) an electromagnetic field in regions of three-dimensional space that substantially surround a focal point of the lens 10. As a result, the lens 10 can achieve a focal point having a sub-diffraction limit spot dimension. In other words, the focal point of the lens 10 can have a spot dimension that is less than a free-space wavelength of the incident optical signal. The lens 10 thus can achieve a focusing spot dimension not currently available by conventional lenses. In addition, because the concentric rings 12 and the disc 16 are formed from the dielectric material, the lens 10 can be fabricated without the use of metals or other materials that may increase complexity of fabrication processes. For example, the lens 10 can have a substantially constant thickness to provide a generally planar construction, which facilitates its construction via known semiconductor fabrication techniques. As used herein relative to dimensions, the term "substantially" is intended to convey that while a given dimension may be intended have a particular value (absolute or relative), it may vary due to process variations during fabrication (e.g., by as much as about 5%).

The focusing characteristics of the lens 10, such as focal length and effective wavelength of the incident optical signal, can be set based on a variety of predetermined factors. For example, a quantity of the rings 12, a thickness of the lens 10, a width of the rings 12 (e.g., a radial dimension defined as a difference between outer-diameter (OD) and inner-diameter (ID)), and a spacing of the gaps 14 can each be individually controlled to achieve a specific focal length for a given wavelength of an incident optical signal.

Additionally, the lens 10 can be configured, based on the teachings herein, in a variety of ways that may differ in construction from the example of FIG. 1. For example, the lens 10 need not include the disc 16, but could instead merely include a gap in an inner-most ring 12. As another example, the lens 10 need not be limited to a circular shape, but could instead have an oval shape, a rectangular shape, or another geometric shape.

Figure 2:
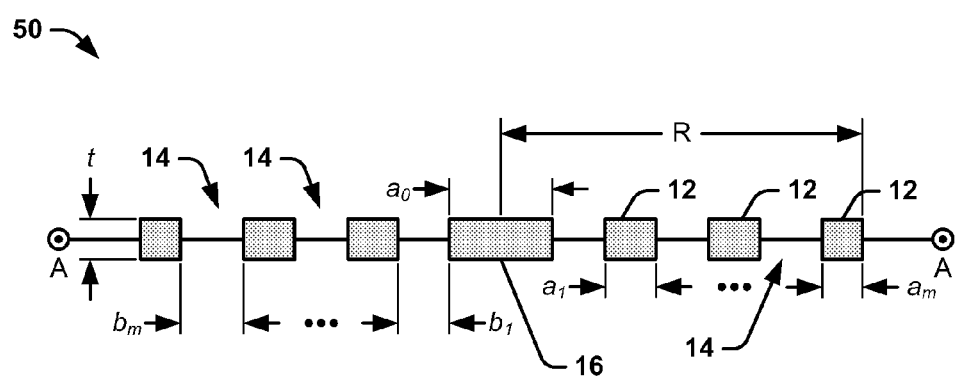
FIG. 2 illustrates an example of a diagram of a cross-sectional view of a lens taken along line A-A in FIG. 1.

FIG. 2 illustrates an example of a diagram 50 of a cross-sectional view of the lens 10 taken along line A-A in FIG. 1. In the example of FIG. 2, the lens 10 is demonstrated as having a variety of independent dimensions. The independent dimensions of the lens 10 can control the focusing characteristics of the lens 10.

In the example of FIG. 2, the lens 10 includes a circular shape and has an overall radius, demonstrated as "R", from a center-point of the lens 10 to an outer-diameter of the lens 10 that is and a thickness that is demonstrated as "t". In the example of FIG. 2, the thickness t of the disc 16 and the concentric rings 12 is demonstrated as substantially uniform. Therefore, as described herein, processes for fabricating the lens 10 can be greatly simplified, and the lens 10 can be implemented within a smaller volume than traditional lenses. However, while the example of FIG. 2 demonstrates a uniform thickness t, it is to be understood that the lens 10 can be fabricated such that different rings could have different thicknesses.

The lens 10 is also demonstrated as having a radial dimension "a" for each of the dielectric portions of the lens 10. For example, the disc 16 of the lens 10 has a diameter that is demonstrated as $a_0$. Each of the m concentric rings 12 has a radial width that is demonstrated as $a_1$ through $a_m$. Thus, in the example of FIG. 2, the radial width of a given ring 12 corresponds to the OD of the given ring 12 minus the ID of such ring 12. Similarly, each of the gaps 14 has a radial width that is demonstrated as having a dimension "b". For example, each of a quantity of n gaps 14 has a radial spacing width that is demonstrated as $b_1$ through $b_n$. Thus, in the example of FIG. 2, the radial spacing of a given ring 12 corresponds to a distance between concentric rings, such as can be defined as the ID of a given ring 12 minus the OD of an next inner-most ring 12.

The dimensions of the given components (e.g., the disc 16, the rings 12, and the gaps 14) can all be configured independently, each of which can vary according to application requirements. For example, the widths $a_1$ through $a_m$ of each of the rings 12 can be the same or different with respect to each other. Similarly, the spacing widths $b_1$ through $b_n$ of each of the gaps 14 can be the same or different with respect to each other and with respect to the widths $a_1$ through $a_m$ of each of the rings 12. In addition, while the example of FIGS. 1 and 2 demonstrate that the lens 10 includes three concentric rings 12 (e.g., m=3), as described in greater detail herein, the lens 10 can include more or less concentric rings 12.

The independent dimensions of the lens 10 can thus control of the focusing characteristics of the lens 10. As an example, the dimensions of the lens 10 can be optimized for a set of desired focusing characteristics of the lens 10 based on implementation of an optimization algorithm. For example, the optimization algorithm can be implemented as a stochastic optimization algorithm (e.g., a genetic algorithm) programmed to determine each of the dimensions t, $a_0$ through $a_m$, and $b_1$ through $b_n$ based on a given quantity m of concentric rings 12. Thus, prior to fabrication of the lens 10, a predetermined quantity m of the concentric rings 12 can be selected as an input to the genetic algorithm, such that the dimensions t, $a_0$ through $a_m$, and $b_1$ through $b_n$ can be optimized for the given quantity m of the concentric rings 12 to achieve the desired focusing characteristics of the lens 10.

Figure 3:
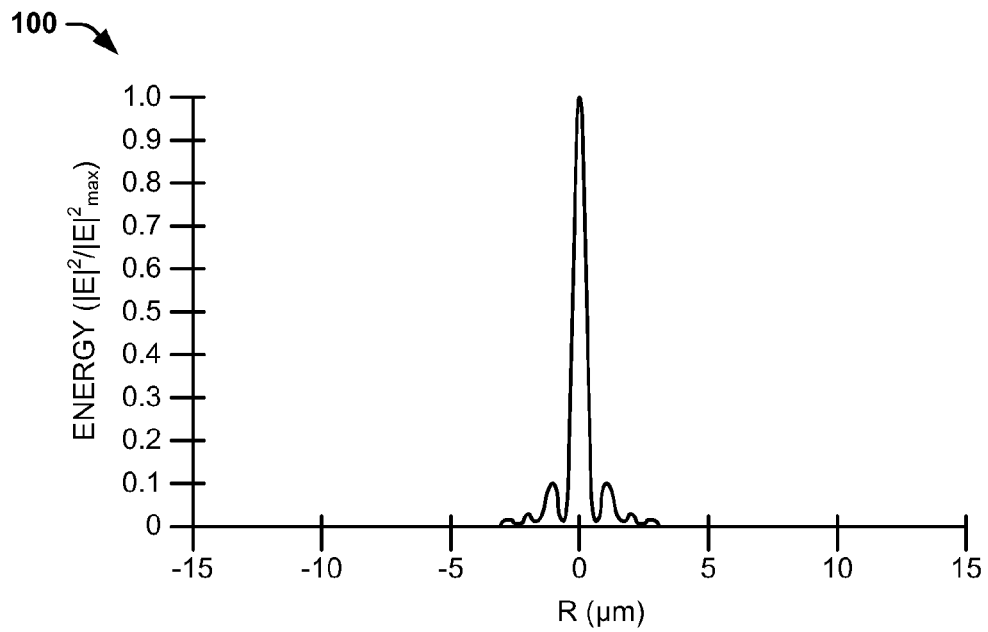
FIG. 3 illustrates an example of a graph of field intensity versus radius of a lens.

FIG. 3 illustrates an example of a graph 100 of energy versus radius of the lens 10. The graph 100 demonstrates the energy characteristics of the lens 10 in units of $|E|^2/|E|^2_{max}$ for a radius of the lens 10 in microns (μm). For example, the graph 100 demonstrates an energy profile for the lens 10 having the disc 16 and a quantity m=9 concentric rings of varying dimensions t, $a_0$ through $a_9$, and $b_1$ through $b_9$ to achieve a focal length of approximately 400 nanometers (nm) for an incident optical signal having a wavelength $\lambda_0$ of approximately 1.55 μm, full width at half maximum (FWHM) of the incident optical signal of approximately 0.52 μm, and a power transmission of approximately 36.5%. Thus, the graph 100 demonstrates that, at the focal length of approximately 400 nm, the lens 10 can achieve a substantially full-energy focal spot of less than the wavelength of the incident optical signal.

Figure 4:
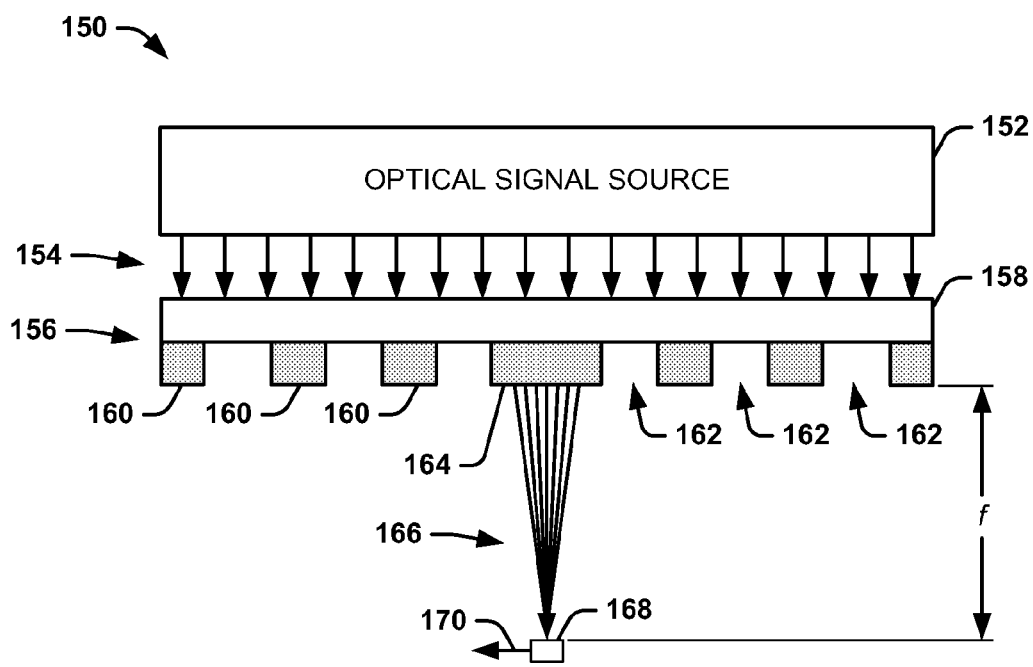
FIG. 4 illustrates an example of an optical system.

FIG. 4 illustrates an example of an optical system 150. The optical system 150 can be implemented in a variety of optical applications, such as imaging, surgical applications, or for data read/write associated with physical media, such as a compact disc, digital video data (DVD) disc, or Blu-ray disc applications.

The optical system 150 demonstrates an optical signal source 152 that is configured to provide an optical signal, demonstrated by arrows 154, incident upon a lens 156. The lens 156 includes a transparent substrate 158, a plurality of rings 160, a plurality of gaps 162 interleaved with the rings 160, and a central disc 164. The transparent substrate 158 can be a substrate upon which the rings 160 and the disc 164 can be formed, such as in an IC process, and can be formed from any of a variety of transparent materials (e.g., silica) to pass the optical signal 154 with minimal attenuation. Thus, the optical signal 154 can be provided incident on the transparent substrate 158 to pass the optical signal 154 to the central disc 164 and the concentric rings 160.

The optical signal 154 can thus resonantly couple the concentric rings 160 to substantially cancel the electro-magnetic energy of the optical signal 154 at a distal side of the lens 156 relative to the optical signal 154. As a result, the optical signal 154 is focused at a predetermined focal length f away from the lens 156, as demonstrated by arrows 166. Accordingly, the focal spot of the optical signal 154 at the focal length f can have a spot dimension that is less than a diffraction limit of the optical signal 154, and thus less than a wavelength of the optical signal 154. As a further example, an optical receiving device 168, such as a photodiode or charged coupled device, can be located at the predetermined focal spot of the lens 156 for converting the focused beam to a corresponding output signal (e.g., an electrical signal) 170. A plurality of such lenses 156 and optical receiving devices 168 can be utilized in a variety of applications.

Figure 5:
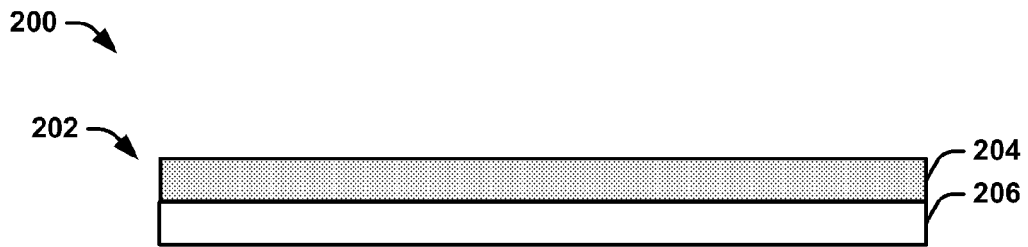
FIG. 5 illustrates an example structure comprising a dielectric material deposited on a substrate.

FIGS. 5-9 demonstrate an example of process steps that can be utilized to fabricate a lens. FIG. 5 illustrates an example diagram 200 of a structure 202 comprising a dielectric material layer 204 formed on a substrate 206. For example, the dielectric layer can be deposited onto the substrate, can be oxidized from a layer of substrate material (e.g., through thermal oxidation), or can be formed via sputtering, chemical vapor deposition, or other techniques. As an example, the dielectric material layer 204 can be formed from any one of a variety of dielectric materials, such as silica. The substrate 206 can be formed from a variety of transparent materials, such as silica or another transparent medium. The dielectric material layer 204 can be formed on the substrate 206 to have a thickness t, which can be optimized (e.g., via a stochastic optimization algorithm) along with other lens parameters to achieve a set of desired focusing characteristics of the lens 156 in the example of FIG. 4.

Figure 6:
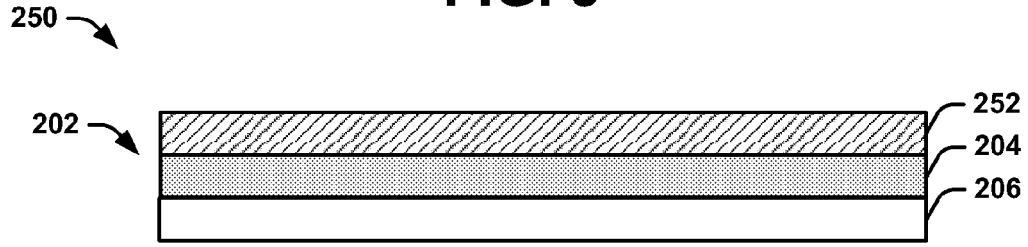
FIG. 6 illustrates an example structure including a photoresist layer applied to the structure of FIG. 5.

FIG. 6 illustrates an example diagram 250 of the structure 202 of FIG. 5 including an additional mask layer (e.g., a photoresist) 252 applied over the dielectric layer 204. The photoresist layer 252 can have a thickness of about 500 Å to about 5000 Å. However, it is to be appreciated that the thickness thereof may be of any dimension suitable for fabricating a lens (e.g., the lens 156 in the example of FIG. 4). For instance, the thickness of the photoresist layer 252 can vary in correspondence with the wavelength of radiation used to pattern the photoresist layer 252. The photoresist layer 252 may be formed over the dielectric material layer 204 via spin-coating or spin casting deposition techniques.

Figure 7:
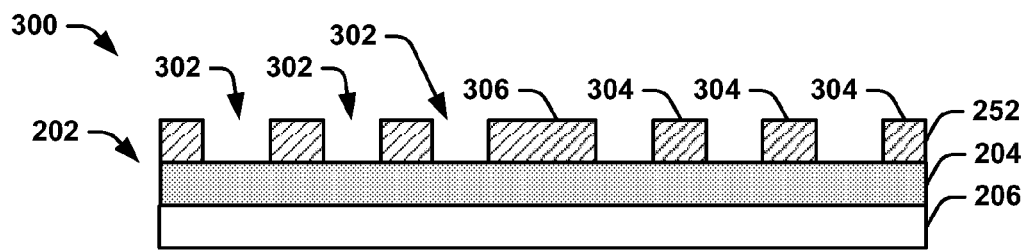
FIG. 7 illustrates an example structure that includes the photoresist layer of the structure of FIG. 6 being patterned.

FIG. 7 illustrates an example diagram 300 of the structure 202 of FIG. 6 with the photoresist layer 252 having been patterned to form a plurality of concentric gaps 302. Each of the gaps 302 in the photoresist layer can be dimensioned to have OD and ID dimensions that are predetermined according to desired optical properties of the lens being constructed. The gaps 302 thus provide a pattern of a plurality of concentric rings 304 in the patterned photoresist layer 252 at predetermined locations (e.g., corresponding to the gaps 162), such as can be determined based on a stochastic optimization method. The patterned photoresist layer 252 can likewise remove a central cylindrical disc 306 of the patterned photoresist layer 252, having a predetermined diameter and a central location (e.g., corresponding to the disc 164).

The patterned photoresist layer 252 can thus serve as an etch mask layer for processing or etching the underlying dielectric material layer 204 to include the rings 160, the gaps 162, and disc 164. As an example, the quantity n of the patterned gaps 302 can be selected as an input to the genetic algorithm, such that the respective OD and ID dimensions of the patterned gaps 302 can be optimized for the given quantity n of the concentric gaps 302 to achieve the desired focusing characteristics of the lens 156 of the example of FIG. 4.

Figure 8:
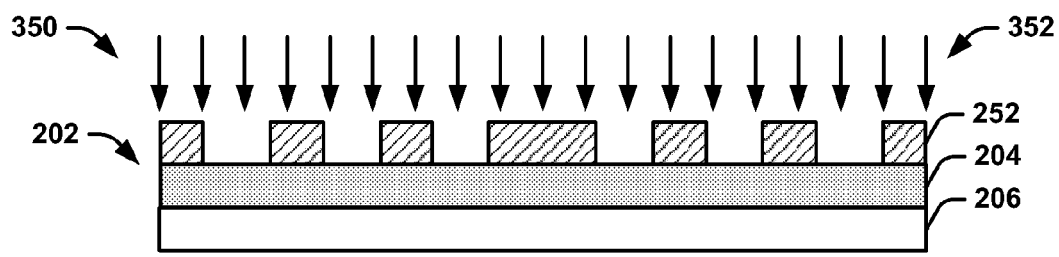
FIG. 8 illustrates the example structure of FIG. 7 being etched.

FIG. 8 illustrates an example diagram 350 of the structure 202 of FIG. 7 undergoing an etching step, as indicated by the arrows 352. The etch can be performed by plasma etching (e.g., an anisotropic deep reactive ion etching (DRIE) technique). However, any suitable etch technique may be used to etch the dielectric material layer 204. For example, the dielectric material layer 204 can be anisotropically etched with one or more plasma gases, such as carbon tetrafluoride ($CF_4$) containing fluorine ions, in a commercially available etcher, such as a parallel plate DRIE apparatus or, alternatively, an electron cyclotron resonance (ECR) plasma reactor to replicate the mask pattern of the patterned photoresist layer 252.

Figure 9:
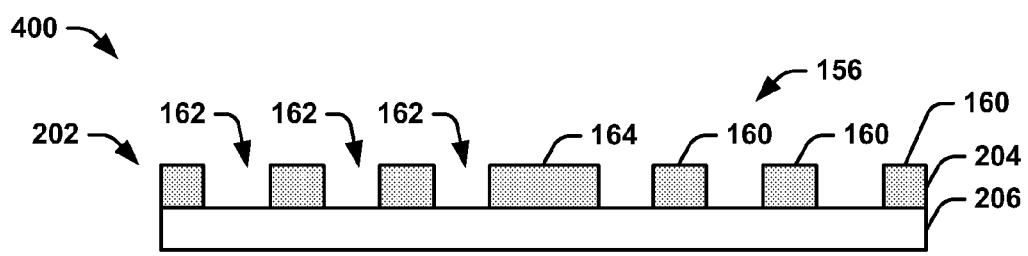
FIG. 9 illustrates an example structure after the etching of FIG. 8 is substantially complete.

FIG. 9 illustrates an example diagram 400 of the structure 202 of FIG. 8 after the etching step is substantially complete. The diagram 400 illustrates a complete lens 156 after a stripping step (e.g., ashing in an O₂ plasma) is substantially complete to remove remaining portions of the patterned photoresist layer 252. Therefore, the lens 156 includes the gaps 162 that have been etched via the etch process of the example of FIG. 8 in the dielectric material layer 204, thus leaving the plurality of concentric rings 160 and the disc 164. The DRIE etch process is thus demonstrated in the example of FIG. 9 as having etched the dielectric material layer 204 completely down to the transparent substrate 206, such that the gaps 162 can have a depth of approximately the dimension t in the example of FIG. 2.

Figure 10:
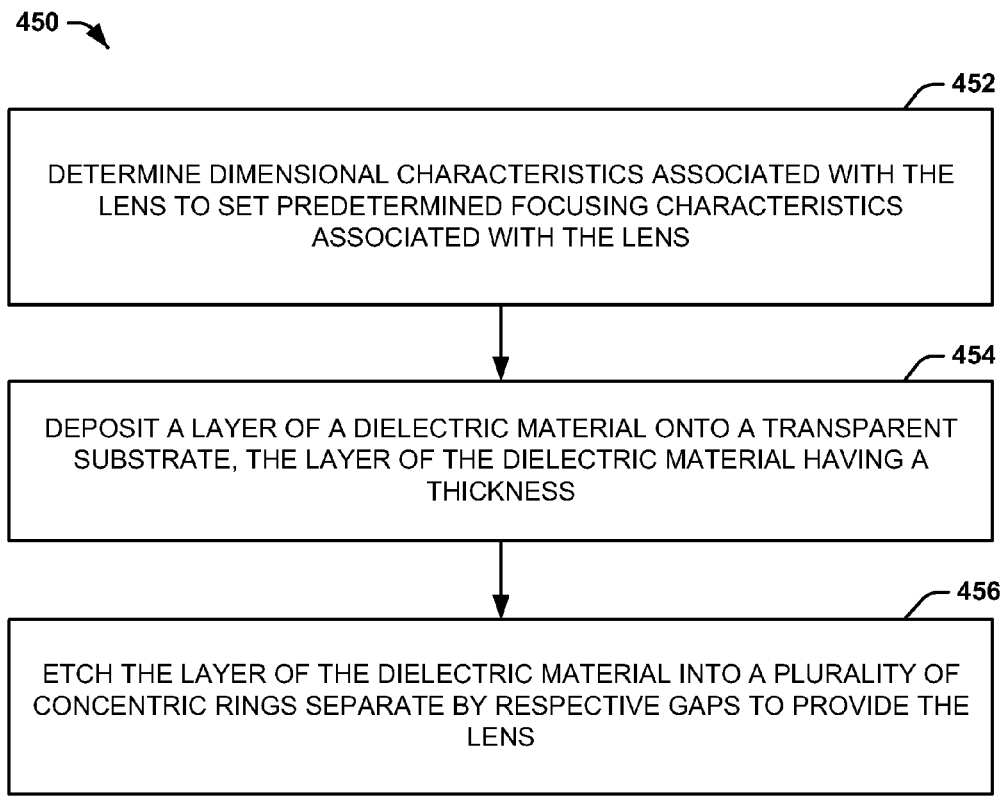
FIG. 10 illustrates an example of a method for forming a lens.

In view of the foregoing structural and functional features described above, an example method will be better appreciated with reference to FIG. 10. While, for purposes of simplicity of explanation, the method of FIG. 10 is shown and described as executing serially, it is to be understood and appreciated that the method is not limited by the illustrated order, as parts of the method could occur in different orders and/or concurrently from that shown and described herein.

FIG. 10 illustrates an example of a method 450 for forming a lens. At 452, dimensional characteristics associated with the lens are determined to set predetermined focusing characteristics associated with the lens. For example, the determination can be implemented as an optimization algorithm (e.g., a stochastic optimization algorithm) to determine the dimensional characteristics of the lens. At 454, a layer of a dielectric material is deposited onto a transparent substrate. The layer of the dielectric material can have a thickness that is selected based on the determination at 452. At 456, the layer of the dielectric material is etched into a plurality of concentric rings separated by respective of gaps. The spacing of the plurality of the gaps, the radial width of the plurality of concentric rings, and the quantity of the plurality of concentric rings can be selected based on the determination at 452.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A lens comprising a plurality of concentric rings formed from a dielectric material interleaved by a plurality of gaps separating the plurality of concentric rings wherein the plurality of concentric rings resonantly couple with each other in response to an incident optical signal to achieve a focal point at a focal length that is substantially beyond a diffraction limit associated with the incident optical signal.

2. The lens of claim 1, further comprising a disc in an approximate center of the lens that is formed from the dielectric material, the disc having a thickness that is substantially equal to the thickness of the plurality of concentric rings.

3. The lens of claim 1, wherein the dielectric material comprises silica.

4. The lens of claim 1, wherein the thickness, a spacing of the plurality of the gaps, a width of the plurality of concentric rings, and a quantity of the plurality of concentric rings are selected to determine focusing characteristics associated with the lens.

5. The lens of claim 1, wherein the resonant coupling between the plurality of concentric rings at a resonant frequency associated with the incident optical signal mitigates an electromagnetic field associated with the incident optical signal in regions of three-dimensional space surrounding the focal point.

6. The lens of claim 1, further comprising a transparent substrate, the plurality of concentric rings being on the transparent substrate, the transparent substrate arranged to receive an incident optical signal and to pass the incident optical signal to the lens for focusing the incident optical signal at a focal length thereof.

7. The lens of claim 1, wherein each of the plurality of concentric rings has a thickness that is substantially equal with respect to each other.

8. A lens comprising a plurality of concentric and substantially coplanar rings of a dielectric material, the plurality of concentric and substantially coplanar rings resonantly couple with each other in response to an incident optical signal to sub-diffraction limit focusing at a focal spot.

9. The lens of claim 8, further comprising a disc in an approximate center of the lens that is formed from the dielectric material, the disc and the plurality of concentric rings having a substantially uniform thickness in a direction that is transverse to a coplanar surface of the disc and the plurality of concentric rings.

10. The lens of claim 8, wherein each adjacent pair of the plurality of concentric rings are separated by a respective gap, wherein a thickness of the plurality of concentric rings, a spacing of the plurality of the gaps, a width of the plurality of concentric rings, and a quantity of the plurality of concentric rings are selected to set focusing characteristics associated with the lens.

11. The lens of claim 8, further comprising a transparent substrate on which the plurality of concentric rings reside, the transparent substrate being arranged to receive an incident optical signal and to passing the incident optical signal to the lens for focusing the incident optical signal at the focal spot.

12. A method for forming a lens, the method comprising:
determining dimensional characteristics associated with the lens to set predetermined focusing characteristics associated with the lens;
depositing a layer of a dielectric material onto a transparent substrate, the layer of the dielectric material having a thickness that is selected based on the determination of dimensional characteristics; and
etching the layer of the dielectric material to provide a plurality of concentric rings of the dielectric material separated by respective gaps, the spacing of the plurality of the gaps, a radial width of the plurality of concentric rings, and a number of the plurality of concentric rings being set based on the determination of dimensional characteristics wherein the plurality of concentric rings resonantly couple with each other in response to an incident optical signal to achieve a focal point at a focal length that is substantially beyond a diffraction limit associated with the incident optical signal.

13. The method of claim 12, wherein determining the dimensional characteristics comprises:

selecting a predetermined quantity of the plurality of concentric rings as a constant parameter;
determining the thickness of the layer of the dielectric material
determining the spacing of the plurality of the gaps, and
determining the width of the plurality of concentric rings to optimize the predetermined focusing characteristics based on the selected predetermined number of the plurality of concentric rings.

14. The method of claim 13, wherein determining the dimensional characteristics further comprises implementing a genetic algorithm to optimize the predetermined focusing characteristics associated with the lens based on the thickness of the layer of the dielectric material, the spacing of the plurality of the gaps, and the width of the plurality of concentric rings, and the quantity of the plurality of concentric rings.

15. The method of claim 12, wherein the substrate comprises a transparent substrate, and
wherein the layer of a dielectric material comprises a layer of silica.

* * * * *